United States Patent [19]

Morino et al.

[11] Patent Number: 4,718,029
[45] Date of Patent: Jan. 5, 1988

[54] DISPLAY DEVICE FOR A PROGRAMMABLE ELECTRONIC CALCULATOR

[75] Inventors: Masuaki Morino, Kyoto; Yoshiyuki Fujikawa; Isamu Haneda, both of Nara; Tetsuo Myoi, Kyoto, all of Japan

[73] Assignee: Sharp Kabushiki Kaisha, Osaka, Japan

[21] Appl. No.: 816,688

[22] Filed: Jan. 6, 1986

Related U.S. Application Data

[63] Continuation of Ser. No. 442,232, Nov. 16, 1982, abandoned.

[30] Foreign Application Priority Data

Nov. 18, 1981 [JP] Japan ................. 56-186207
Nov. 25, 1981 [JP] Japan ................. 56-189506

[51] Int. Cl.$^4$ ........................................ G06F 3/147
[52] U.S. Cl. ............................. 364/710; 364/709
[58] Field of Search ................. 364/710, 709, 706

[56] References Cited

U.S. PATENT DOCUMENTS

| | | | |
|---|---|---|---|
| 3,839,630 | 10/1974 | Olander, Jr. et al. | 364/710 |
| 4,009,379 | 2/1977 | Musch | 364/709 |
| 4,075,679 | 2/1973 | Christoper et al. | 364/200 |
| 4,145,742 | 3/1979 | Olander, Jr et al. | 364/709 |
| 4,145,752 | 3/1979 | Olander, Jr. et al. | 364/709 |
| 4,177,520 | 12/1979 | Meff | 364/710 |
| 4,181,965 | 1/1980 | Olander, Jr. et al. | 364/710 |
| 4,301,511 | 11/1981 | Shimizu et al. | 364/709 |

FOREIGN PATENT DOCUMENTS

2655241 6/1977 Fed. Rep. of Germany .

*Primary Examiner*—David H. Malzahn
*Attorney, Agent, or Firm*—Birch, Stewart, Kolasch & Birch

[57] ABSTRACT

A display device for a programmable electronic calculator comprises an input device for inputting the contents of a display to be displayed in the display device, a sheltering display memory for storing the contents of the previous display for sheltering when the display device is adapted to provide a new display, and a circuit for extracting the contents of the sheltering display memory so that the display device displays the contents sheltered, again. In another form of the present invention, a programmable electronic calculator comprises a keyboard containing a plurality of key switches, a key sequence setting device for setting a key operation sequence to one of one or more key switches selected from the plurality of key switches, a display device for displaying a specific item, a display enabling device activated to enable the display device to display the specific item and a display controller responsive to the display enabling device for permitting the display device to display a symbol representative of the key operation sequence.

4 Claims, 13 Drawing Figures

| KEY | DISPLAY |
|---|---|
| (a) | PRO          I |
| (b) [MODE] | RUN          I |
| (c) [MODE] | RESERVE      I |
| (d) [/] | F1:_    RESERVE    I |
| (e) [S][I][N] | F1:SIN   RESERVE   I |
| (f) [ENTER] | F1:SIN   RESERVE   I |
| (g) [↕] | RESERVE      II |
| (h) [↕] | RESERVE      III |
| (i) [$] | F4:    RESERVE    III |
| (j) [G][O][T][O] | F4:GOTO_   RESERVE   III |
| (k) [ENTER] | F4:GOTO   RESERVE   III |
| (l) [↕] | RESERVE      I |
| (m) [/] | F1:SIN      I |

FIG. 9

|     | KEY | DISPLAY |
| --- | --- | --- |
| (a) | MODE | RESERVE                I<br>_ |
| (b) | SHIFT ["] | "                     RESERVE                I<br>_ |
| (c) | S I N SPACE | "SIN              RESERVE                I<br>_ |
| (d) | C O S SPACE | "SIN COS       RESERVE                I<br>_ |

. . .

|     | KEY | DISPLAY |
| --- | --- | --- |
| (e) | E X P | "SIN COS TAN LN LOG EXP _ |
| (f) | SHIFT ["] | "SIN COS TAN LN LOG EXP" _ |
| (g) | ENTER | SIN COS TAN LN LOG EXP |

FIG. 10

| KEY | DISPLAY |
|---|---|
| (a) [1][0] | PRO 10_     III |
| (b) [▲▼] | PRO SIN COS TAN LN LOG EXP    I |
| (c) [▲▼] | PRO ASN ACS ATN DEG DMS SGN    II |
| (d) [▲▼] | PRO PRT IF INPUT GOT GSB RTN    III |
| (e) [$] | PRO 10    GOTO_     III |
| (f) [3][0] | PRO 10    GOTO 30     III |
| (g) [ENTER] | PRO 10 : GOTO 30     III |
| (h) [2][0] | PRO 20     III |
| (i) [RCL] | PRO PRT IF INPUT GOT GSB RTN    III |
| (j) [#] | PRO 20    INPUT_     III |
| (k) [A][,][B] | PRO 20    INPUT A,B_     III |
| (l) [ENTER] | PRO 20 : INPUT A,B     III |

DISPLAY DEVICE FOR A PROGRAMMABLE ELECTRONIC CALCULATOR

This application is a continuation of application Ser. No. 442,232, filed on Nov. 16, 1982, now abandoned.

BACKGROUND OF THE INVENTION

The present invention relates to a programmable electronic calculator and, more particularly, to a portable, programmable electronic calculator or a portable, personal computer.

The conventional electronic calculators have a one-line display device composed of a liquid crystal display to match a limited display zone. In such a narrow display device, previous display contents must be removed from the narrow display device to show recent display contents. It is impossible to simultaneously display a plurality of items of data.

However, in a particular mode for the electronic calculator such as a program debug mode, it is indispensable to display the plurality of items including program lines of the program to be run, the serial number of the lines, and the calculated results etc. Since it was impossible to simultaneously display the plurality of items, the program debugging operation were not effectively achieved.

In another aspect of the electronic calculator, it has been proposed to provide a specific type of electronic calculator for enabling a reserve mode wherein a specific function key sequence (key operation sequence) can be assigned to any one of several reserve keys. It is very easy to define a specific function of a single one of the reserve keys provides the same effect as if a plurality of keys are operated. Any desired key sequence can be reserved independently of the number of the key switches installed.

The reserve mode is different from a double function mode in which a specific function is defined by subsequently actuating a function group selecting key and a specific function key. In the double function mode, all the functions must be printed near the related key switches. The kinds of functions stored may depend on the number of key switches installed.

In the electronic calculator for enabling the reserve mode, it is very inconvenient to determine the key sequences which have been reserved, in particular, when the number of the reserve keys is great.

SUMMARY OF THE INVENTION

Accordingly it is an object of the present invention to provide an improved electronic calculator for displaying a specific item of data selected from a plurality of items of data.

It is another object of the present invention to provide an improved display device in an electronic calculator for determining key sequences which have been reserved in the reserve mode.

Briefly described, in accordance with the present invention, a display device for a programmable electronic calculator comprises an input device for inputting the contents of a display to be displayed in the display device, a sheltering display memory for storing the contents of the previous display for sheltering when the display device is adapted to provide a new display, and means for selectively extracting the contents of the sheltering display memory so that the display device redisplay the sheltered contents.

In another form of the present invention, a programmable electronic calculator comprises a keyboard means containing a plurality of key switches, a key sequence setting means for setting a key operation sequence to one of one or more key switches selected from the plurality of key switches, a display device for displaying a specific item, a display enabling means activated to enable the display device to display the specific item, and a display controller responsive to the display enabling means for permitting the display device to display a symbol representative of the key operation sequence.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
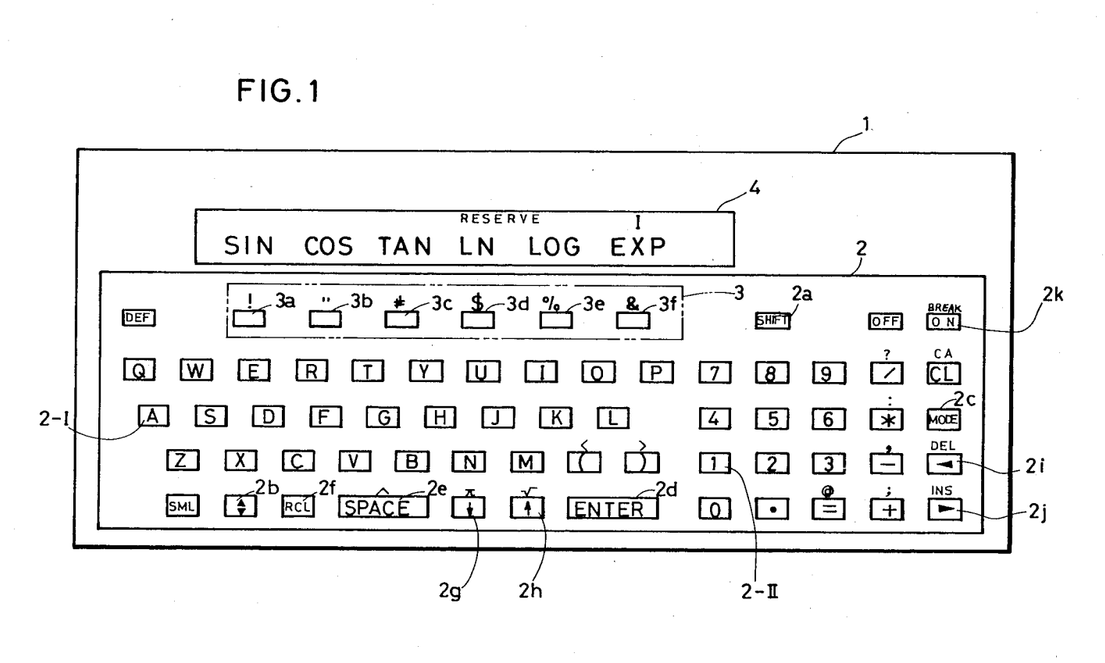
FIG. 1 is a plan view of an embodiment of a programmable electronic calculator of the present invention.

FIG. 1 shows a plan view of a programmable electronic calculator 1 of the present invention. The calculator 1 comprises a keyboard 2 including a group of reserve keys 3 and other keys. The programmable electronic calculator 1 further includes a display panel 4 made of a liquid crystal display panel of the dot matrix type.

Among non-reserve keys in the keyboard 2, an operation mode selection key 2C is provided for selectively placing the programmable electronic calculator in a run mode (normal operational mode) a programming mode, and a reserve mode. When the operation mode selection key 2c is actuated in the run mode, the programmable electronic calculator is placed in the programming mode. When the operation mode selection key 2c is actuated in the programming mode, the programmable electronic calculator is placed in the run mode. The thus selected mode is displayed on the display panel 1 through the use of a symbol segment in the display panel 4.

The reserve keys 3 contain six reserve keys 3a to 3f. Each of the reserve keys 3a to 3f defines a fixed function command.

Each of the function commands is printed adjacent each of the reserve keys 3a to 3f. Each of the reserve keys 3a to 3f is actuated together with a shift key 2a to select and input the fixed function command.

Each of the reserve keys 3a to 3f is actuated to reserve any desired key sequence. In a specific form of the present invention, each of the reserve keys 3a to 3f can be actuated to reserve three different key sequences in three function modes switched with the operation of a function mode selection key 2b.

Among the non-reserve keys 2, alphabet keys 2-I are provided for inputting English letters. Digit keys 2-II are provided for inputting digits. An entry key 2d is actuated to control the execution of the operation. That is, when the enter key 2d is actuated after a desired command is introduced through the use of the alphabet keys 2-I, the program related to the introduced command is executed.

A space key 2e is actuated to provide a space. A key 2g is actuated to recall the program contents in the programming mode and to instruct to run each of the steps in the program in the run mode. A key 2h is actuated to recall the program contents in the programming mode and, in the run mode, to recall the contents of sheltered display information and to instruct to display the contents of the present program. The sheltered display information has been removed from the display panel to display the present program information.

A reverse cursor key 2i and a forward cursor key 2j are actuated to move the cursor in inputting and amending the programs. A display control key 2f is actuated to display either of the display information defined in the programming mode and display information presently input by switching. Since the keys 2i, 2j and 2f are not effective in the run mode, they can be operated to recall the sheltered contents. A key 2k is actuated to start to power the electronic calculator and to interrupt the execution of the program.

The electronic calculator of the present invention is operated by combining the function modes and operation modes. As stated above, the three function modes can be switched by operating the function mode selection key 2b. The three function modes are the modes in which the key sequences are reserved by operating the reserve keys 3. Each of the reserve keys 3a to 3f can be operated to reserve the three kinds of key sequences by switching the function mode selection key 2b. The display panel 4 can display one of the function modes, which is presently selected, with symbols of "I", "II" and "III".

The operation modes are to operate the electronic calculator. As stated above, the operation mode selection key 2c is actuated to select one of the programming mode, the run mode and the reserve mode. The display panel 4 can display each of symbols of "PRO", "RUN" and "RESERVE" to indicate each of these modes.

Figure 2:
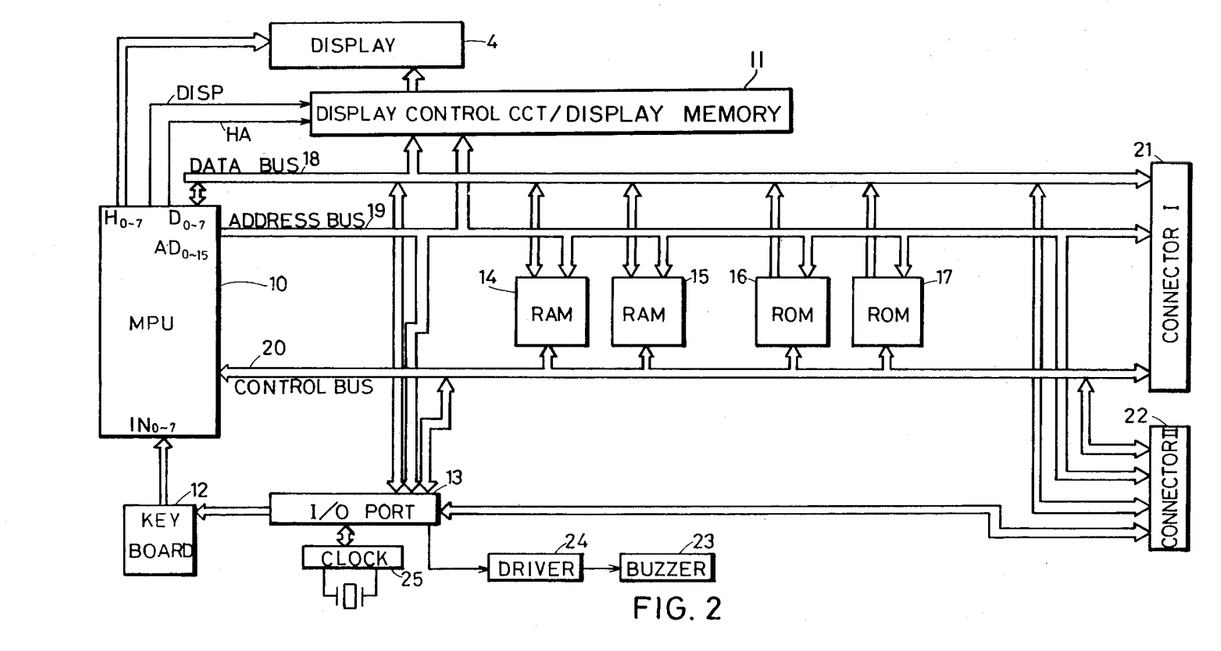
FIG. 2 is a schematic block diagram of a circuit implemented in the programmable electronic calculator of FIG. 1.

FIG. 2 shows a block diagram of a circuit implemented within the electronic calculator 1 of FIG. 1. The circuit comprises a display control circuit 11 for controlling the display on the display panel 4 inclusive of the numeral display, the alphabet display and the symbol display. A keyboard circuit 12 is associated with various keys provided on the input panel of the programmable electronic calculator 1. The key board circuit 12 receives a key stroke signal developed from an input/output port 13, and the key board circuit 12 develops a key return signal which is applied to a microprocessor unit (MPU) 10.

The circuit further includes read/write memories (RAM) 14 and 15 which function as various registers and flags for storing various data inclusive of user programs. Read only memories (ROMs) 16 and 17 store control programs and interpreters for executing programs.

The random access memories (RAMs) 14 and 15 and the read only memories (ROMs) 16 and 17 are connected to the MPU 10 through an address bus 19, a data bus 18 and a control bus 20.

A connector 21 is provided for connecting the MPU 10 to outer ROMs and RAMs, if required. The address bus 19, the data bus 18 and the control bus 20 are led to the connector 21. A connector 22 is provided for connecting the MPU 10 to an input/output device including a tape recorder, a printer and a floppy disk, and/or an extension memory. The buses 18, 19 and 20 are also led to the connector 22. The connector 22 is further connected to the input/output port 13.

The input/output port 13 is also connected to the address bus 19, the data bus 18 and the control bus 20, and functions as an interface for the MPU 10.

The circuit of FIG. 2 further includes a buzzer 23 which is activated by a driver circuit 24. A clock circuit 25 associated with a crystal oscillator is provided. The above-mentioned input/output port 13 further functions to provide control signals to the clock circuit 25 and the driver circuit 24. The clock circuit 25 stores the time information data to prov;de clock pulses to the input-/output port 13.

The MPU 10 develops a synchronization signal HA and a display ON/OFF signal DISP which are applied to the display control circuit 11. The MPU 10 further develops back plate signals $H_0$ through $H_7$ which are applied to the display panel 4. The display control circuit 11 includes a display memory (not shown), each bit of the display memory corresponding to each segment included in the display panel 4. That is, a desired pattern is displayed on the display panel 4 when a desired bit pattern is written into the display memory included in the display control circuit 11.

The RAMs 14 and 15, and the display memory in the display control circuit 11 can be backed up even if the main power is turned off, so that their memory contents are sustained.

Figure 3:
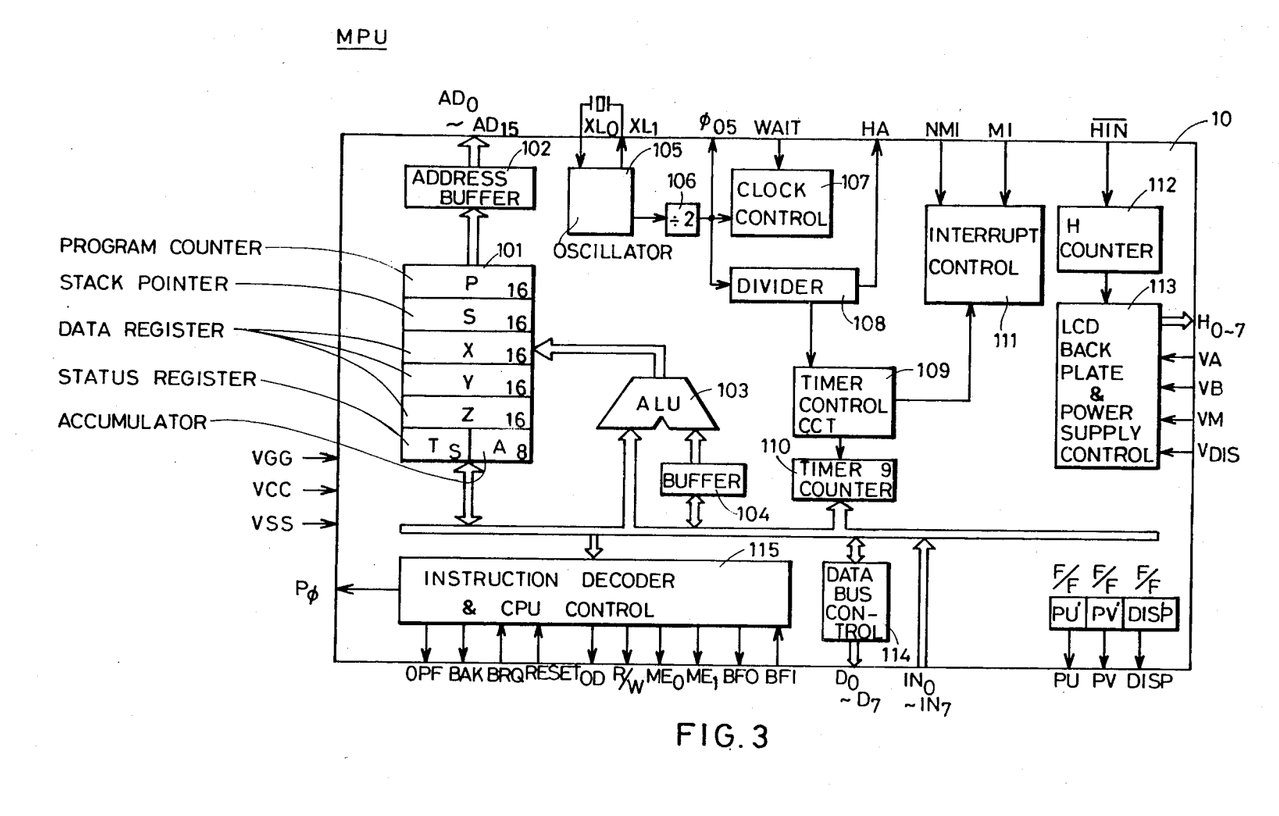
FIG. 3 is a block diagram of a microprocessor unit included in the circuit of FIG. 2.

FIG. 3 shows an inner circuit arrangement of the MPU 10 of FIG. 2. The MPU 10 is, for example, one of models LH 5800 and LH 5801 produced by SHARP KABUSHIKI KAISHA (Sharp Corporation).

With reference to FIG. 3, the MPU 10 comprises a group of registers 101 including a program counter P, a stack pointer S, data registers X, Y and Z, an accumulator A and a status register T.

The program counter P is a register of a 16-bit construction, and functions to store the address data next to the command now executed by the MPU 10. The contents stored in the program counter P are increased by one when the next command is fetched. A stack pointer S is a register of a 16-bit construction, and functions to indicate the address of the stack which should be selected in the push-down operation or the pop-up operation of the memories. Data registers X, Y and Z are registers of a 16-bit construction. The data registers X, Y and Z function not only as the data registers but also as the data pointers. An accumulator A functions to store the calculation results, and functions as a buffer register for conducting the data transfer between the outer memory and the main body of the programmable electronic calculator 1. A status register T memorizes various conditions such as a carry, borrow, zero and overflow in the arithmetic calculation operation.

An address buffer circuit 102 is provided for connecting the registers 101 to the address bus $AD_0$ through $AD_{15}$. The MPU 10 further includes an arithmetic and logic unit (ALU) 103 and a buffer circuit 104 for arithmetic calculation purposes.

As an inner clock generator, an oscillator circuit 105 includes terminals $XL_0$ and $XL_1$ which are connected to the crystal oscillator. A frequency divider ($\frac{1}{2}$) 106 is connected to receive the output signal of the oscillator circuit 105, and an output signal of the frequency divider ($\frac{1}{2}$) 106 is applied to a clock control circuit 107. The clock control circuit 107 controls the development of the timing signals in response to a timing control signal (WAIT) applied thereto in order to generate and stop the inner clocks.

Another frequency divider 108 is connected to receive the output signal of the frequency divider ($\frac{1}{2}$) 106. The output signal of the frequency divider 108 is applied to the display control circuit 11 as the synchronization signal HA. The output signal of the frequency divider 108 is also applied to a timer controller 109. The timer controller 109 controls the count operation and the interrupt operation of a timer counter 110. The timer counter 110 is a polynomial counter of a 9-bit construction and functions to count a time interval for timer interruption.

An interruption control circuit 111 controls the interruption operation in accordance with the interruption request introduced through terminals NMI and MI and the signal developed from the timer controller 109. An H counter 112 is provided for developing the back plate signal which is applied to the display panel 4. An input signal $\overline{H_{IN}}$ of the counter 112 is normally connected to the synchronization signal HA. A display control circuit 113 receives display drive voltages $V_{DIS}$, $V_A$, $V_B$ and $V_M$, and develops the back plate signals $H_0$ through $H_7$. The MPU 10 further includes flip-flops PU' and PV' of the versatile use, a flip-flop DISP' for controlling ON/OFF operation of the display, and a data bus control circuit 114.

Signals introduced through input ports $IN_0$ through $IN_7$ are introduced into and stored in the ALU 103 as eight-bit data. The data bus $D_0$ through $D_7$ transfer the data bidirectionally, thereby effecting the data writing operation into the outer memory or the data reading operation from the outer memory. An instruction decoder/CPU control circuit 115 is provided for controlling the system operation. The instruction decoder/CPU control circuit 115 develops various control signals such as a memory write control signal R/W, and memory enable signals $ME_0$ and $ME_1$. An operation power is noted as $V_{GG}$ and a back up power is noted as $V_{CC}$.

As a specific preferred form of the present invention, the electronic calculator 1 is featured to display a specific item of data selected from a plurality of items of data.

As an example of a BASIC program, the program of Table 1 is inputted to operate the electronic calculator 1. To input the program of Table 1, key operations, display contents related thereto, and the program run contents are shown in Table 2.

TABLE 1

| | |
|---|---|
| 10 | WAIT 100 |
| 20 | FOR X=1 TO 2 |
| 30 | PRINT "X=";X |
| 40 | NEXT X |
| 50 | STOP |
| 60 | END |

TABLE 2

| NO. | KEY | DISPLAY | RUN CONTENTS |
|---|---|---|---|
| 1 | RUN | Run | |
| 2 | | | 10 WAIT 100 |
| 3 | | | 20 FOR X=1 TO 2 |
| 4 | | X=1 | 30 PRINT "X=";X |
| 5 | | X=1 | 40 NEXT X |
| 6 | | X=1 | 20 FOR X=1 TO 2 |
| 7 | | X=2 | 30 PRINT "X=";X |
| 8 | | X=2 | 40 NEXT X |
| 9 | | BREAK IN 50 | 50 STOP |
| 10 | ↓ | > | 60 END |

The first program line 30 is executed to obtain X=1. X=1 is displayed. The display time is defined according to the instruction of line 10. The display contents are not changed until the second program line 30 is executed. The second program line 30 is executed to obtain X=2.

After the loop "FOR-NEXT" is executed twice, the program line 50 is executed to display "BREAK IN 50", indicating that the program run is stopped at a program line 50. Thereafter, the key 2g is operated to run the next program line 60. A mark for indicating that the program run is completed is displayed to wait key input operation.

Table 3 shows key operations, display contents and program run contents to debug the program of Table 1.

TABLE 3

| NO. | KEY | DISPLAY | RUN CONTENTS |
|---|---|---|---|
| 1 | TRON | TRON | |
| 2 | RUN | RUN | |
| 3 | | 10: | 10 WAIT 100 |
| 4 | ↓ | 20: | 20 FOR X=1 TO 2 |
| 5 | ↑ | 20: FOR X=1 TO 2 | |
| 6 | RELEASE | | |
| 7 | ↓ | X=1 | 30 PRINT "X=";X |
| 8 | | 30: | |
| 9 | ↑ | X=1 | |
| 10 | | 30: PRINT "X=";X | |
| 11 | RELEASE | X=1 | |
| 12 | ↓ | 40: | 40 NEXT X |
| 13 | ↓ | 20: | 20 FOR X=1 TO 2 |
| 14 | ↑ | X=1 | |
| 15 | | 20: FOR X=1 TO 2 | |
| 16 | RELEASE | X=1 | |
| 17 | ↓ | X=2 | 30 PRINT X |
| 18 | | 30: | |
| 19 | ↓ | 40: | 40 NEXT X |
| 20 | ↓ | BREAK IN 50 | 50 STOP |
| 21 | ↓ | | 60 END |

Statement "TRON" in BASIC covers commands "TRACE MODE ON" and "DEBUG MODE ON". The program of Table 3 is run after the command "TRON" is run. Each time the respective program lines are executed, the serial numbers of the lines are displayed to thereby stop the program run. The key 2g is operated to run the program for the next line number. The serial number of the program line executed is displayed and the program is stopped as indicated in No. 4 of Table 3.

The key 2h is operated so that the run contents are displayed which are related to the line number displayed at the time when the key 2h is operated as indicated in No. 5 of Table 3.

When the depressing operation of the key 2h is stopped, the display contents are cleared as indicated in No. 6 of Table 3. That is, the contents of the line are being displayed as long as the key 2h continues to be operated.

The key 2g is further actuated to run the next program line in order to display the results "X=1" as long as the time corresponding to "WAIT 100" in the program line 10 as indicated in No. 7 of Table 3. Thereafter, automatically, the program line number is displayed by switching, as indicated in No. 8 of Table 3.

The key 2h is further operated to display the result "X=1" for a moment, which are previously displayed, as indicated in No. 9 of Table 3. Thereafter, the line number and the program contents related to the results "X=1" are displayed as indicated in No. 10 of Table 3. As long as the key 2h continues to be operated, the program contents are displayed. When the operation of the key 2h is released, the results "X=1" are displayed as indicated in No. 11 of Table 3.

Thus, the display contents previously displayed can be redisplayed.

The specific preferred form of the present invention will be described with reference to FIGS. 4 to 7.

Figure 4:
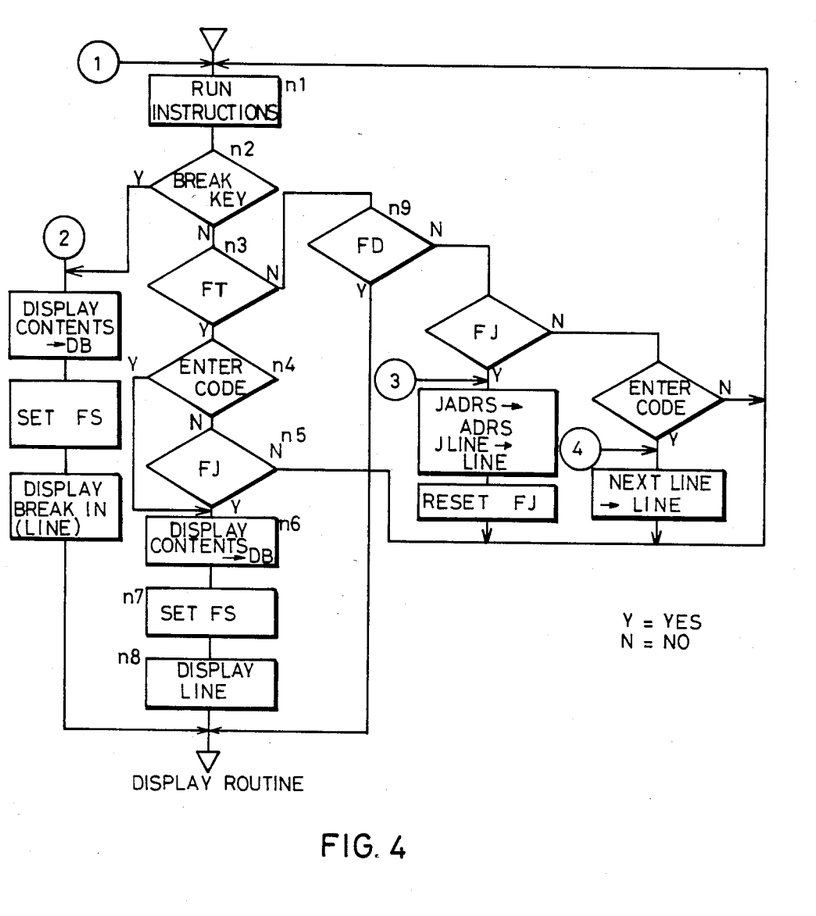
FIGS. 4 to 7 are flow charts for explaining operational modes of the programmable electronic calculator of FIGS. 1 and 2 according to a preferred form of the present invention.

With reference to FIG. 4, a specific command is run at step $n_1$. In step $n_2$, it is detected whether the BREAK key 2k is operated or not. The BREAK key 2k is actuated during the running of the program. When the BREAK key 2k is actuated, the display contents are entered into the sheltering display buffer DB to thereby set a flag FS to indicate this sheltering operation. A symbol "BREAK IN (the number of the line interrupted)" is displayed.

In BASIC statements "GOTO", "GOSUB" and "NEXT", the next program run should be carried out by moving to other program lines. In such a case, the address and the line number of the target to move are stored, respectively, into registers JADRS and JLINE to set a flag FJ. A flat FD in step $n_9$ is provided for indicating whether the program should be stopped at each of the lines or not. When the flag FD is set, the program is stopped at each of the lines. A flag FT in step $n_3$ is provided for indicating "TRACE MODE".

In the normal run mode, the flags FD and FT are both reset so that the program is not stopped at each of the lines and the program run continues. When the flag FJ is set, the address and the line number of the target to jump are inputted, respectively, into registers ADRS and LINE so that the program command of the target to jump is run. When the flag FJ is reset, it is detected whether the end of the command sentence is an ENTER code or not. Unless this end is the ENTER code, the next command sentence is run instantly. If this end is the ENTER code, the next line number is detected from the program to enter it into the the register LINE for storage. The next command sentence is thereafter run.

Figure 5:
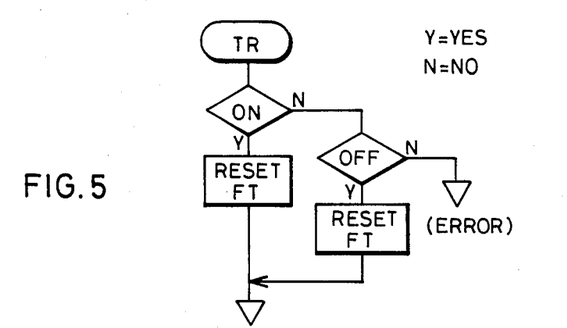

As FIG. 5 shows, the program is run in TRACE MODE and DEBUG MODE. By running statement "TRON", the flag FT is set. To release TRACE MODE and DEBUG MODE, statement "TROFF" is run. When the flag FT is set and the end of the command sentence is the ENTER code, meaning that one line program has been run, the display contents are sheltered into the sheltering display buffer DB in step $n_6$ of FIG. 4. The flag FS is set. In step $n_8$, the present line number LINE is displayed, which corresponds to No. 3 of Table 3. Thereafter, the display routine of FIG. 6 is re-selected.

Even if the end of the command sentence is not the ENTER code, or, another command sentence follows the end of the command sentence, the same operation is executed so long as the flag FJ is set.

Figure 6:
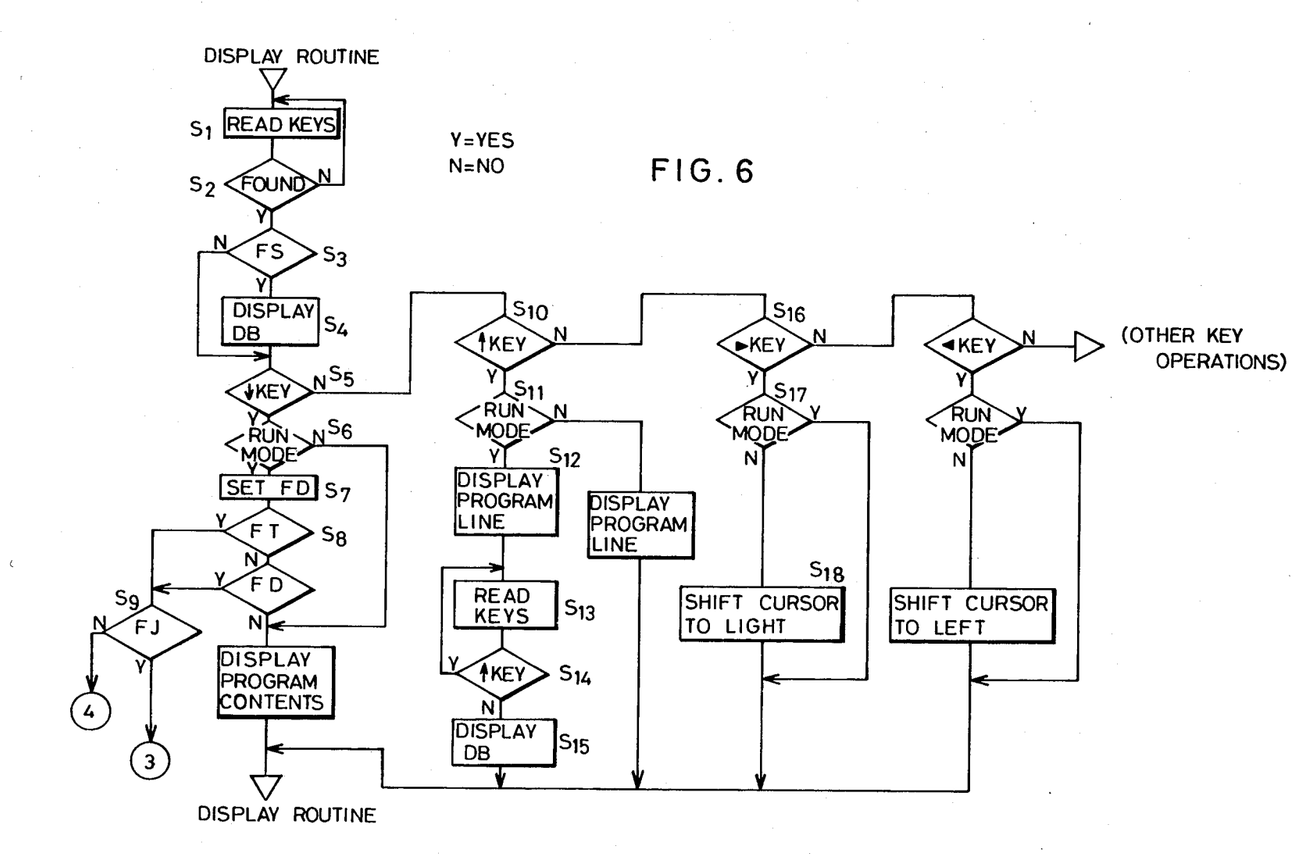

In the display routine of FIG. 6, the operation corresponding to the key operated is carried out in response to the input of the key switch. Any key is operated to set the flag FS. Under the circumstances, in step $S_4$, the contents of the sheltering display buffer DB are returned and displayed. When the key 2g is actuated, the next program run is selected as indicated in $S_5 \rightarrow S_6 \rightarrow S_7 \rightarrow S_8 \rightarrow S_9 \rightarrow$. When the key 2h is actuated in the display routine, the contents of the sheltering display buffer DB are displayed for a moment and, then, the contents of the program line are displayed. The release of the key 2h is postponed. These operations are indicated in $S_3 \rightarrow S_4 \rightarrow S_5 \rightarrow S_{10} \rightarrow S_{11} \rightarrow S_{12} \rightarrow S_{13} \rightarrow S_{14}$.

When the key 2h is released, the contents of the sheltering display buffer DB are displayed, which is related to Nos. 9 to 11 of Table 3. The display contents are sheltered by transferring the contents of the memory in the display control circuit 11 into a location or locations of the RAMs 14 and 15 at a unit of a bit (or dot). This location or these locations of the RAMs 14 and 15 are utilized to calculate for other purposes. The flag FS is provided for indicating whether the display contents are sheltered or not. Depending on the condition of the flag FS, the program control is changed.

Figure 7:
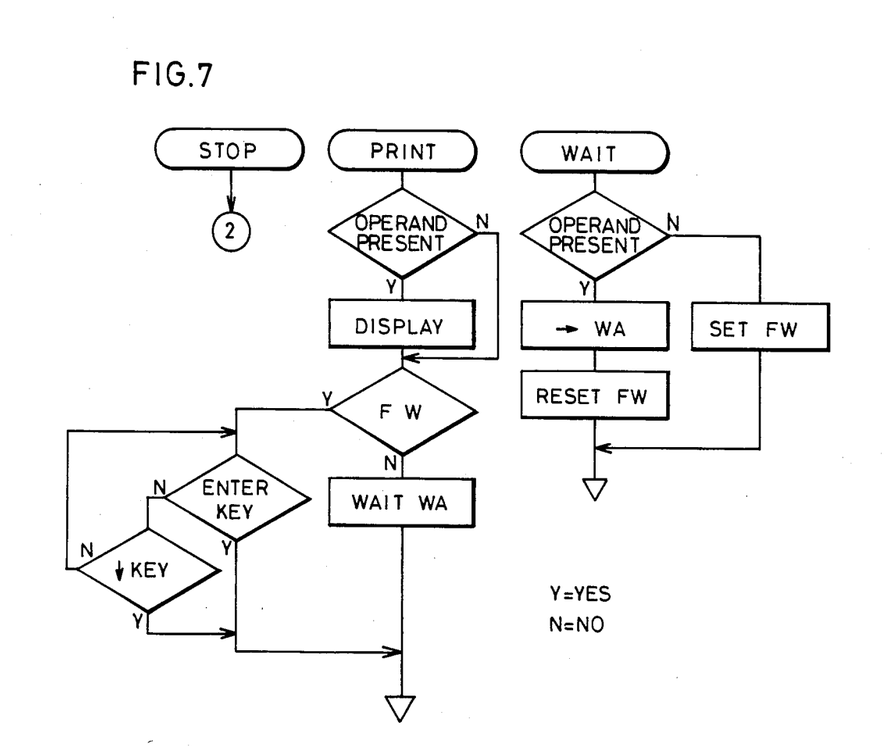

In the display routine of FIG. 7, the contents of the sheltering display buffer DB are returned when the noneffective keys such as the keys 2i, 2j and 2f are operated. For this purpose, a flag FW is set. When the flag FW is reset by running "PRINT" command, a time corresponding to the contents of the register WA is stopped. When the flag FW is set, the "PRINT" command is not terminated until the "ENTER" key 2d or the key 2g is operated.

That is, unless a waiting time is selected in "WAIT" statement, the display just after "PRINT" statement is run is maintained to stop the program run. When "0" is selected as the waiting time, a display is enabled for a time while the operator can not catch the display, so that "PRINT" statement is terminated. In this case, the previously displayed contents can be displayed again by operating the noneffective keys through the interrupt of the program run.

In "PRINT" statement, when any operand ("X=";X) to be displayed is not selected, a new display is not enabled. However, the previous display contents are kept for a time selected.

"STOP" statement is to stop running the program, which is carried out in the same operation as when the "BREAK" key 2K is actuated with reference to FIG. 4.

In another preferred form of the present invention, the electronic calculator 1 is featured to inform key sequences which have been reserved in the reserve mode.

Figure 8:
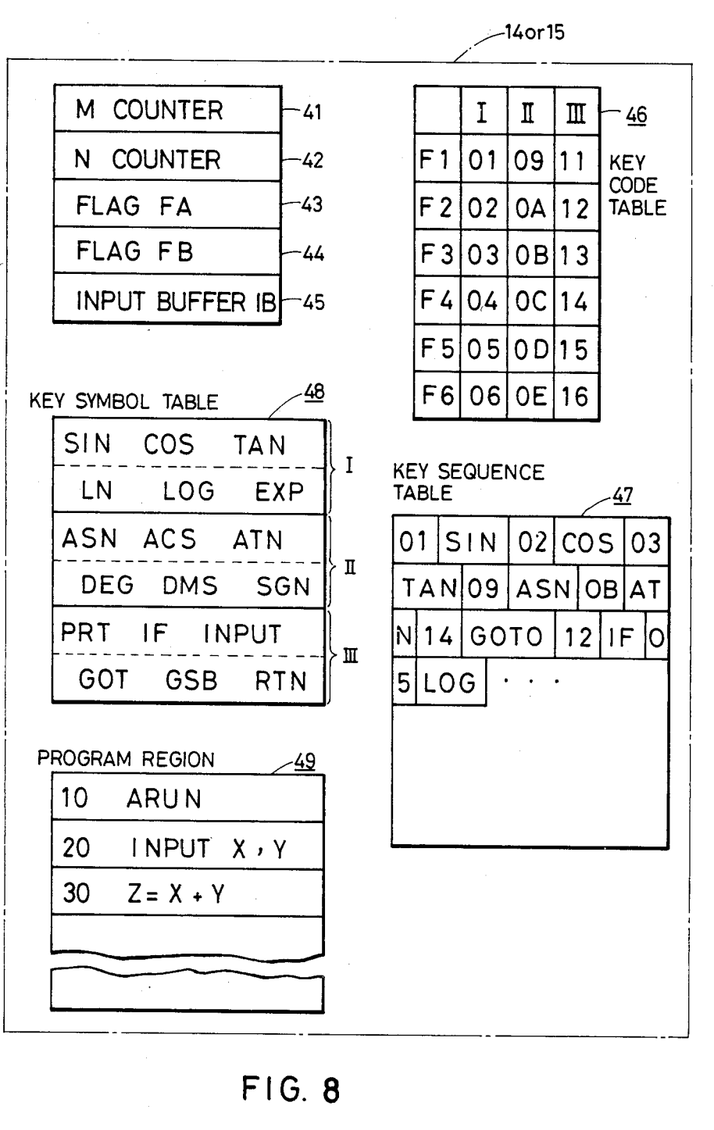
FIG. 8 shows the memory locations of a RAM connected in the circuit of FIG. 2.

FIG. 8 shows the memory locations of the RAM 14 or 15. The RAM 14 or 15 comprises an M counter 41 which is improved by 1 in response to the actuation of the operation mode selection key 2c. The contents of M counter 41 are to indicate the selection of the operation modes. The contents "M" of the M counter 41 correspond to the respective operation modes as follows:

M=1: the programming mode
M=2: the run mode
M=3: the reserve mode

When the mode selection key 2c is operated in the reserve mode, the programming mode is re-selected because of "M=1".

The RAM 14 or 15 comprises an N counter 42 which is advanced by one in response to the operation of the function mode selection key 2b. The contents of the N counter 42 are to indicate the selection of the function modes. The contents "N" of the N counter 42 correspond to the respective function modes as follows:

N=1: the function mode I
N=2: the function mode II
N=3: the function mode III

When the function mode selection key 2b is operated in the function mode III, the function mode I is re-selected because of "N=1".

The RAM 14 or 15 comprises two flags FA 43 and FB 44, and an input buffer IB 45. The flag FA 43 stores whether the key sequence has been reserved for one of the reserve keys 3 or not when said one of the reserve keys 3 is operated in one of the function modes. The flag FB 44 stores that one of the reserve keys 3a to 3f is operated. The input buffer IB 45 stores the key input information or the information stored in the RAM 14 or 15.

The RAM 14 or 15 comprises a key code table 46 for storing key codes which are to be generated in each of the function modes as to each of the reserve keys 3a to 3f. In the key code table 46 each of rows F1 to F6 corresponds to each of the reserve keys 3a to 3f.

For example, when the reserve key 3b is operated in the function mode II, a specific key code "OA" is generated. The key code table 46 stores the key codes in a hexadecimal notation.

The RAM 14 or 15 comprises a key sequence table 47 for storing the key sequence provided with each of the reserve keys 3a to 3f. The arrangement of the key sequences in the key sequence table 47 corresponds to the arrangement of the key codes in the key code table 46.

The RAM 14 or 15 comprises a key symbol table 48 for storing a key symbol as to each of the function modes. The key symbols are preliminarily set by the operator to indicate that one of the reserve keys 3 is to set any key sequence. The key symbols can be set with any symbol. For example, a key sequence "GOTO" can be set and shortened to be "GOT". The key symbols are read out in the programming mode to display them in the display panel 4. The RAM 14 or 15 comprises a program region 49 for storing a program input by the operator.

Figure 9:
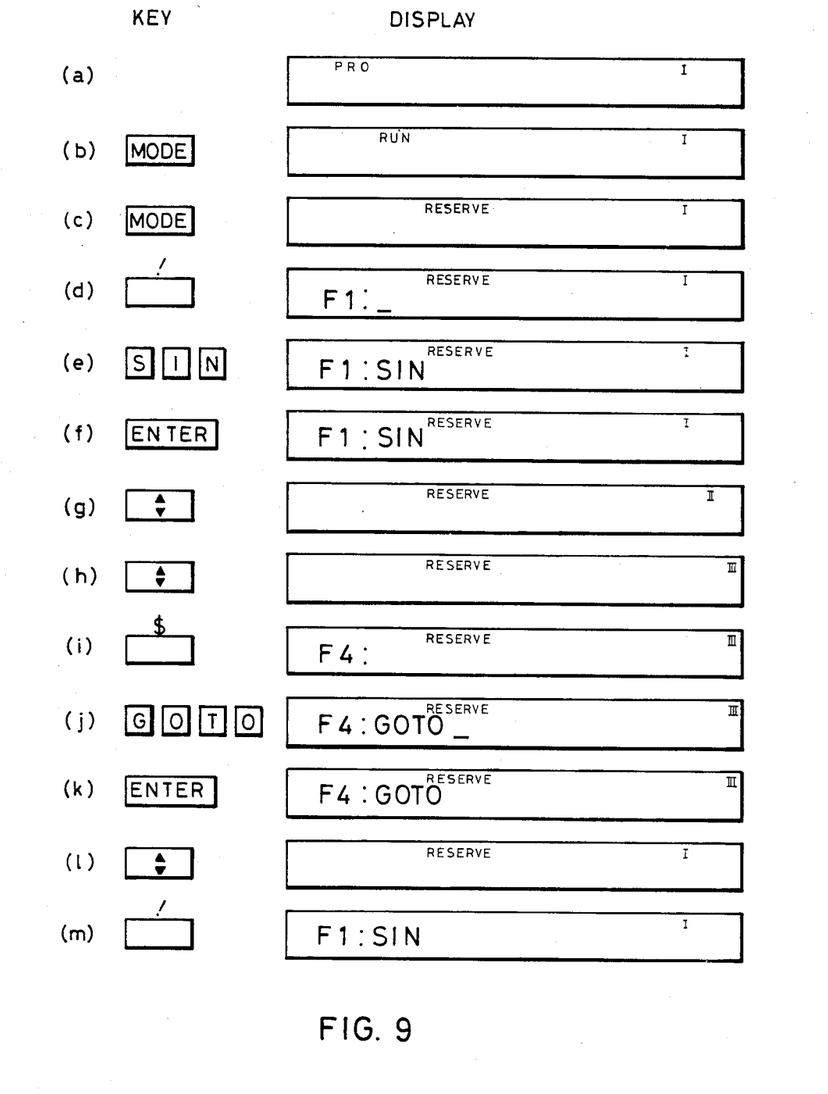
FIGS. 9 to 11 show display contents as related to key operations according to another preferred form of the present invention.
Figure 10:
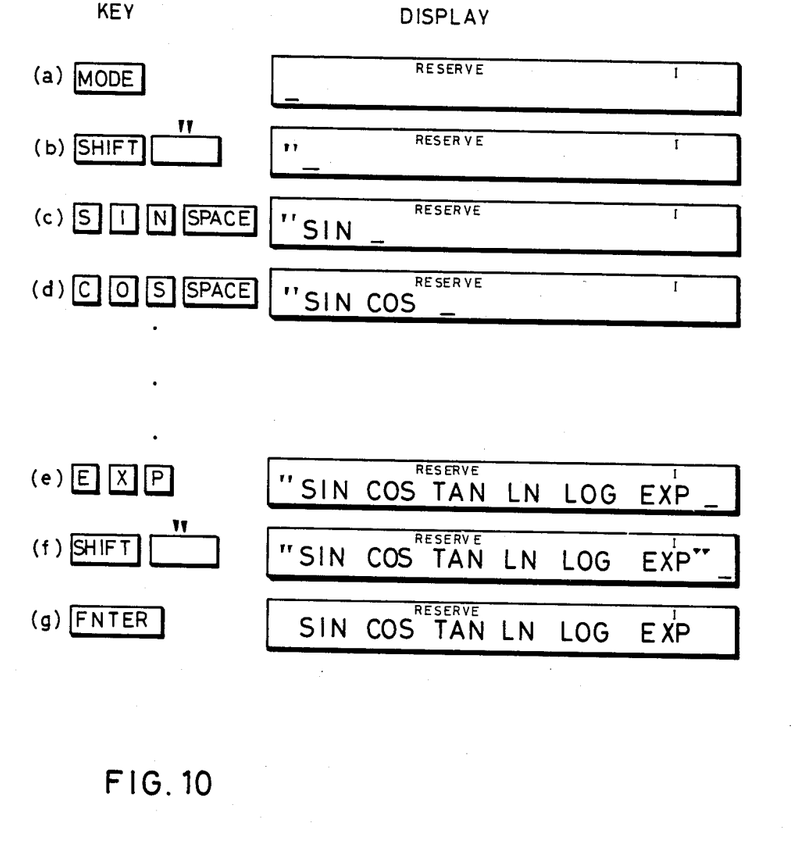
Figure 11:
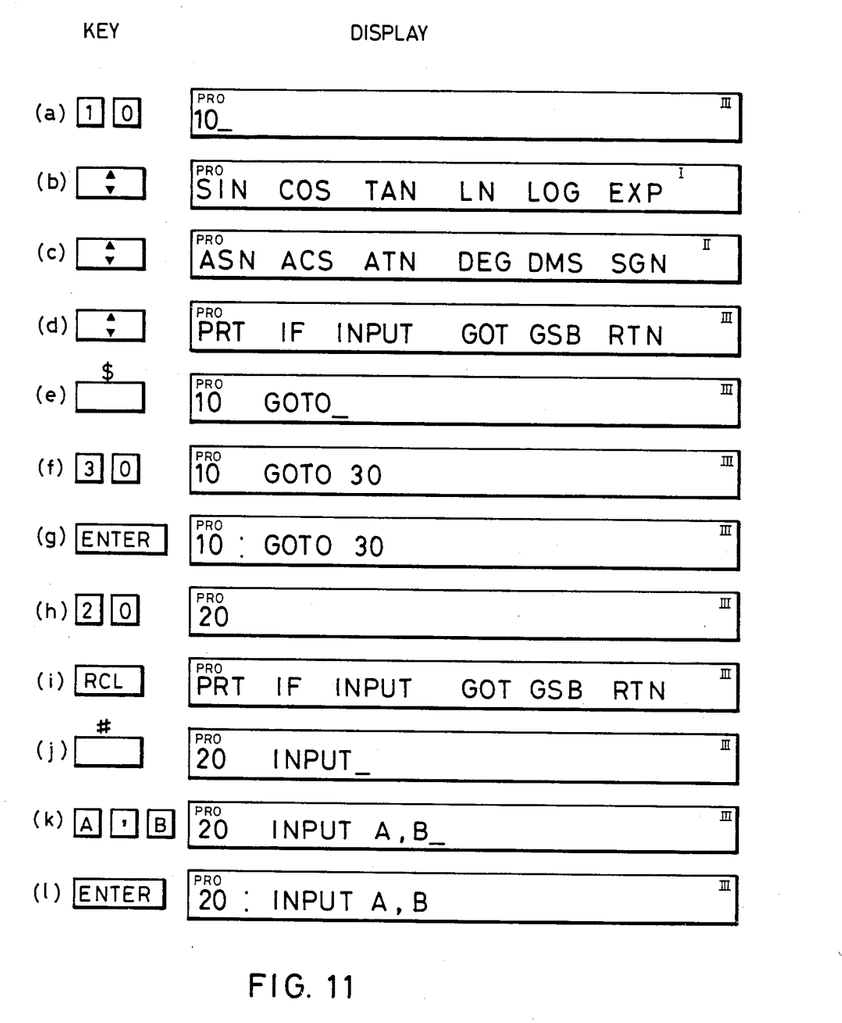
Figure 12A:
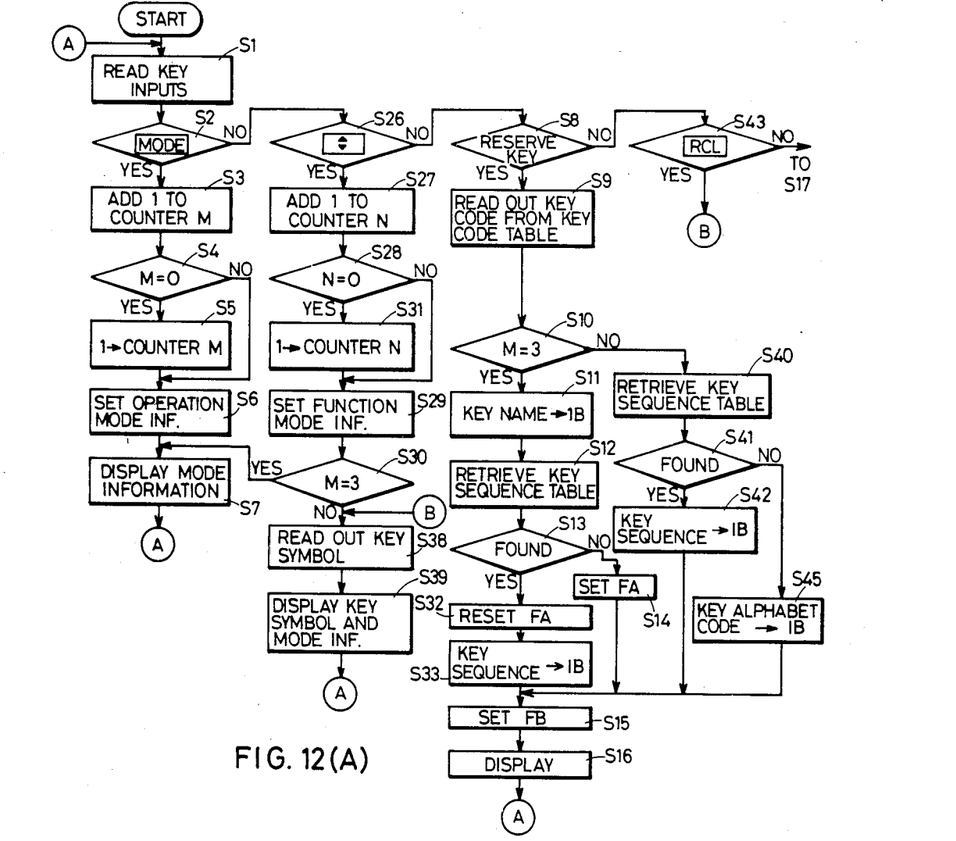
FIGS. 12(A) and 12(B) show a flow chart for explaining operational modes of the programmable electronic calculator of FIGS. 1 and 2 according to another preferred form of the present invention.
Figure 12B:
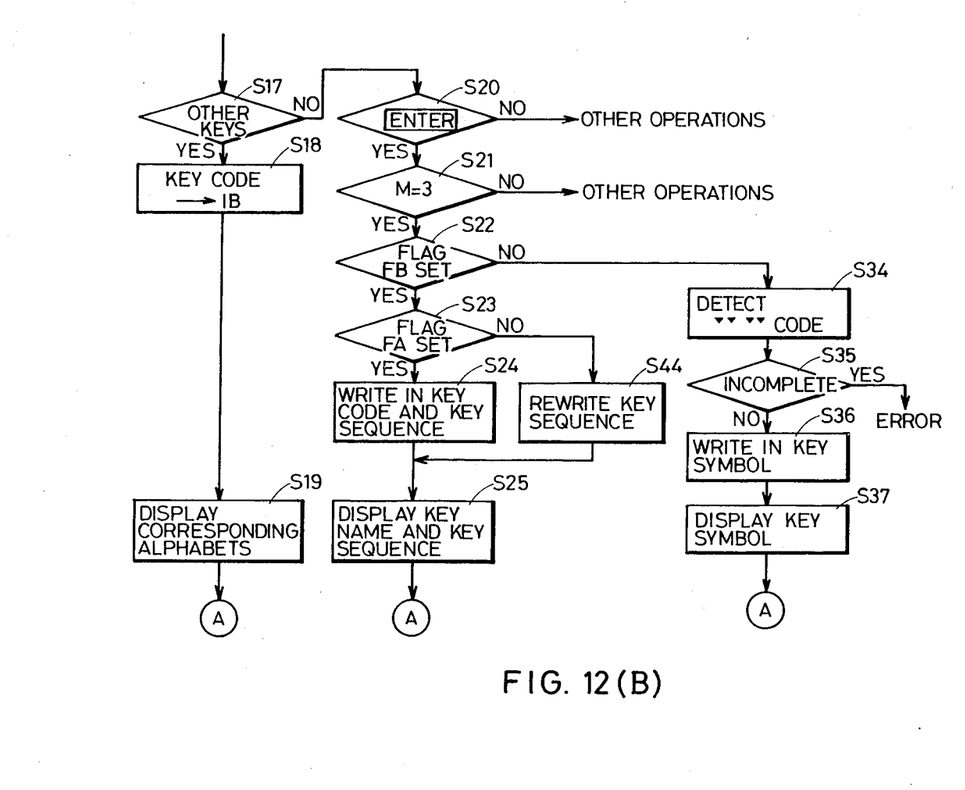

FIGS. 9 to 11 show key operations and display contents related thereto. FIG. 9 shows a case where the key sequences are reserved to the reserve keys 3a to 3f. FIG. 10 shows a case where the key symbols are set. FIG. 11 shows a case where a program is set. FIGS. 12(A) and 12(B) show a flow chart of the operation of another preferred form of the present invention. Another preferred form of the present invention will be described with reference to FIGS. 1 to 12(B).

Key input information is read in step $S_1$ of FIG. 12(A). The operation mode selection key 2c is operated so that, as FIG. 9-(a) to 9-(c) show, the M counter 41 is counted up. The operation mode according to the contents of the M counter 41 is displayed in the display panel 4 as indicated in $S_2 \rightarrow S_3 \rightarrow S_4 \rightarrow S_6 \rightarrow S_7$ of FIG. 12(A).

When the operation mode selection key 2c is operated in the reserve mode, the programming mode is re-selected because of "M=1" as indicated in $S_4 \rightarrow S_5 \rightarrow S_6 \rightarrow S_7$ of FIG. 12(A).

As FIG. 9-(d) shows, the reserve key 3a is operated to develop the corresponding key code (in this case, the key code is "01" in the function mode I) from the key code table 46, as indicated in $S_8 \rightarrow S_9$ of FIG. 12(A). In such a time, when the reserve mode is selected because of "M=3", a key name (F1) assigned, as a matter of convenience, to the reserve key 3a is developed from a character generator (not shown) and entered into the input buffer IB 45, as indicated in $S_{10} \rightarrow S_{11}$ of FIG. 12(A).

Step $S_{12}$ is executed to detect whether the key codes identical with the key codes read out in step $S_9$ have been stored in the key sequence table 47. If the key codes corresponding to those of the key sequence table 47 is absent, the flag FA is set. The flag FB is set to display only the key name F1 as shown in FIG. 9-(d), as related to $S_{13} \rightarrow S_{14} \rightarrow S_{15} \rightarrow S_{16}$ of FIG. 12(A).

As FIG. 9-(e) shows, the keys "S", "I" and "N" are operated to input the key sequence to be reserved. The corresponding key codes (different from the key codes in the key code table 46) are inputted into the buffer IB 45 to display the corresponding alphabets, as related to $S_{17} \rightarrow S_{18} \rightarrow S_{19}$ of FIG. 12(B).

As FIG. 9-(f) shows, the entry key 2d is operated to write the key codes "01" for the reserve key 3a and the key sequence "SIN" into a location of the key sequence table 47, as related to $S_{20} \rightarrow S_{21} \rightarrow S_{22} \rightarrow S_{23} \rightarrow S_{23}$ of FIG. 12(B). At the same time, the display panel 4 displays the key name and the key sequence in the same manner as the case of FIG. 9-(e), as related to $S_{25}$ of FIG. 12(B).

As FIGS. 9-(g) and 9-(h) show, the function mode selection key 2b is operated to count up the N counter 42. The display pattern corresponding to the contents of the N counter 42 is set in display control circuit 11 to display the display pattern in the display panel 4, as related to $S_{26} \rightarrow S_{27} \rightarrow S_{28} \rightarrow S_{29} \rightarrow S_{30} \rightarrow S_{37}$ of FIG. 12(A). When the function mode selection key 2b is operated in the function mode III, the function mode I is re-selected because of "N=1", as related to $S_{28} \rightarrow S_{31}$ of FIG. 12(A).

As FIGS. 9-(i) to 9-(k) show, the key sequence "GOTO" is reserved to the reserve key 3d in the function mode III. In FIG. 9-(l), the function mode I is selected. As FIG. 9-(m) shows, the reserve key 3a is operated in the function mode I. Since the key sequence "SIN" has been reserved, it is detected that the corresponding key code is present in the key sequence table 47. The flag FA is reset. The corresponding key sequence is transferred from the key sequence table 47 to the input buffer IB 45 as related to $S_8 \rightarrow S_9 \rightarrow S_{10} \rightarrow S_{11} \rightarrow S_{12} \rightarrow S_{13} \rightarrow S_{32} \rightarrow S_{33}$ of FIG. 12(A). The flag FB is set to display the key name and the key sequence in the display panel 4, as related in $S_{l5} \rightarrow S_{16}$ of FIG. 12(A).

To set the key symbols, as FIG. 10-(a) shows, the operation mode selection key 2c is operated to select the reserve mode. As FIG. 10-(b) shows, the shift key 2a is operated and then the reserve key 3b is operated. The reserve key 3b functions to input the function fixedly assigned to the reserve key 3b. This fixed function is to generate codes used to discriminate the beginning and the end of the key input information which is inputted to set the key symbol. Adjacent the reserve key 3b, the symbol "▼▼" for indicating the fixed function is printed. The display panel 4 displays the symbol "▼▼".

As FIGS. 10-(c) to 10-(e) show, the key symbols are inputted. The key codes corresponding to the key operated are inputted into the buffer IB 45 to display the related character, as indicated in $S_{17} \rightarrow S_{18} \rightarrow S_{19}$ of FIG. 12(B). As stated above, the key symbols indicate what key sequences are reserved to the respective reserve keys 3a to 3f. According to a user's preference, any symbols can be set. Preferably, as the display panel 4 of FIG. 1 shows the key symbols of the reserve keys 3a to 3f, the character number of the key symbols and the spaces of the key sequences are selected.

As FIG. 10-(f) shows, the shift key 2a and the reserve key 3b are operated so that the symbol "▼▼" is appended to the end character of the last key symbol in the display panel 4. As FIG. 10-(g) shows, the entry key 2d is operated to detect whether the key input information is parenthesized by the code representative of "▼▼" and to detect whether the format is incomplete or not, as related to $S_{20} \rightarrow S_{21} \rightarrow S_{22} \rightarrow S_{34} \rightarrow S_{35}$ of FIG. 12 (B).

When the format is not incomplete, the key symbol parenthesized by the "▼▼" code among the character codes as stored in the input buffer IB 45 is written in the key symbol table 48, as related to $S_{36}$ of FIG. 12(B). The writing operation to the key symbol table 48 is carried out by writing information into an appropriate location of the table 48 depending on the selection of one of the function modes I, II and III. In the case of FIG. 10, the key symbol inputted is written into a location for the function mode I in the key symbol table 48. The display panel 4 displays the key symbol in $S_{37}$ of FIG. 12(B).

The programming operation will be described. FIG. 11 shows an example to program the following:

10 GOTO 30
20 INPUT A, B

As FIG. 11-(a) shows, keys "1" and "0" are operated to display "10" in the display panel 4.

As FIG. 11-(b) shows, the function mode selection key 2b is operated to switch the function mode display in the display panel 4 and to read the key symbol out of the location of the corresponding function mode in the key symbol table 48, so that the key symbol is displayed in the display panel 4, as related to $S_{26} \rightarrow \ldots \rightarrow S_{30} \rightarrow S_{38} \rightarrow S_{39}$ of FIG. 12(B).

As FIGS. 11-(c) and 11-(e) show, the function mode selection key 2b is operated to switch the function mode display and the key symbol display in the display panel 4. Therefore, the operator can search a required key sequence, referring to the key symbol as displayed in the display panel 4.

As FIG. 11-(e) shows, the reserve key 3d is operated in the function mode III to read the key code "14" out of the key code table 46. It is detected that the corresponding key code is present in the key sequence table 47. The key sequence "GOTO" is read out and written into the input buffer IB 45, as related to $S_8 \rightarrow S_9 \rightarrow S_{10} \rightarrow S_{40} \rightarrow S_{41} \rightarrow S_{42}$ of FIG. 12(A). The display panel 4 displays the key sequence table 47, as related to $S_{15} \rightarrow S_{16}$ of FIG. 12(A).

As FIG. 11-(f) shows, the digit is entered. As FIG. 11-(g) shows, the entry key 2d is operated so that the program of "10 GOTO30" is set in the program region 49. As FIG. 11-(h) shows, the digit is inputted and displayed in the display panel 4. As FIG. 11-(i) shows, the display control key 2f is operated not to switch the function mode, but, to read the key symbol in the present function mode out of the key symbol table 48. The key symbol is displayed in the display panel 4. These operations are related to $S_{43} \rightarrow S_{38} \rightarrow S_{39}$ of FIG. 12(A). The operator can search the required key sequence, referring to the display contents at FIG. 11-(i).

As FIG. 11-(j) shows, the reserve key 3i c is operated to read the key sequence "INPUT" out of the key sequence table 47 and to display the key sequence "INPUT" in the display panel 4. As FIG. 11-(k) shows, the necessary information is inputted. As FIG. 11-(l) shows, the entry key 3d is operated to program.

To reserve the key sequence as shown in FIG. 9, if a key sequence has been reserved in the function mode for a reserve key operated, the key sequence in the key sequence table 47 is rewritten in $S_{44}$ of FIG. 12(B). When the reserve key 3 is operated in the programming mode or the run mode, the code representing the fixedly assigned function of the reserve key operated is entered into the input buffer IB 45, as related to $S_{45}$ of FIG. 12(A), as long as no key sequence has been reserved for the reserve key operated.

As stated above, when the function mode selection key 2b or the display control key is operated in the programming mode or the run mode, the display panel 4 displays the key symbol corresponding to the present function mode. Therefore, the operator can know what key sequences have been reserved to the respective reserve keys 3a to 3f.

In the above preferred embodiment of the present invention, the key symbols can be set independently on the set of the key sequences. It may be possible that the key sequences are treated as the key symbols in displaying the key sequences in the display panel 4.

For this purpose, the key sequence table 47 is adapted to store the key sequences in the order of the arrangement of the reserve keys and in the order of the arrangement of the function modes I, II and III. When the key symbols are recalled, the contents of the key sequence table 47 are displayed as a character train. However, the latter method is effective only when the key sequence is short. The latter method is not effective when the key sequence is so long that it becomes difficult to compare the display positions and the positions of the reserve keys, accurately.

While only certain embodiments of the present invention have been described, it will be apparent to those skilled in the art that various changes and modifications may be made therein without departing from the spirit and scope of the invention as claimed.

What is claimed is:

1. A programmable electronic calculator having a plurality of operational modes including a reserve mode, a program mode and a run mode, said program mode permitting input of a program consisting of program information, said run mode permitting operation of the program of the calculator;

mode selection means for permitting an operator to select one of the plurality of operational modes for said calculator;

keyboard means containing a plurality of key switches for inputting specific items of reserve information associated with the operation of the program of the calculator, said reserve information being input in the reserve mode, said key switches also inputting said program information during the program mode, said information input depending upon the mode selected by the mode selection means;

reserve keys associated with each specific item of reserve information, each specific item of reserve information consisting of a selected sequence of said key switches;

display means for selectively displaying a plurality of at least one of said specific items and representations of said specific items of reserve information when said calculator is in the reserve mode, said display means additionally displaying at least a portion of said program information when said calculator is in said program mode; and display controller means for enabling said display means to display at least one of said specific items and said representations of said specific items of said reserve information when said calculator is in the program mode.

2. The calculator of claim 1, wherein the representations of specific items are representations of selected sequences of said key switches.

3. The calculator of claim 1, further comprising:
memory means for storing an indicia inputted by one of the key switches, said display controller means permitting the display means to display the contents of the memory means.

4. The calculator of claim 1, wherein said display controller means and mode selection means are provided by key switches.

* * * * *